United States Patent
Pearce

(10) Patent No.: US 9,424,109 B1
(45) Date of Patent: *Aug. 23, 2016

(54) MAINTAINING TIME FIDELITY FOR AN INSTANCE OF A VIRTUAL SPACE PLACED IN A BACKGROUND STATE

(71) Applicant: KABAM, INC., San Francisco, CA (US)

(72) Inventor: Michael R. Pearce, San Francisco, CA (US)

(73) Assignee: KABAM, INC., San Francisco, CA (US)

(*) Notice: Subject to any disclaimer, the term of this patent is extended or adjusted under 35 U.S.C. 154(b) by 95 days.

This patent is subject to a terminal disclaimer.

(21) Appl. No.: 14/331,198

(22) Filed: Jul. 14, 2014

Related U.S. Application Data

(63) Continuation of application No. 13/564,654, filed on Aug. 1, 2012, now Pat. No. 8,789,055.

(51) Int. Cl.
*G06F 9/46* (2006.01)
*G06F 9/54* (2006.01)
*G06F 9/48* (2006.01)

(52) U.S. Cl.
CPC ............. *G06F 9/542* (2013.01); *G06F 9/4843* (2013.01)

(58) Field of Classification Search
None
See application file for complete search history.

(56) References Cited

U.S. PATENT DOCUMENTS

| | | | |
|---|---|---|---|
| 5,938,723 A | 8/1999 | Hales, II et al. | 709/204 |
| 6,166,727 A | 12/2000 | Kozuka | 345/302 |
| 6,668,278 B1 | 12/2003 | Yen et al. | 709/218 |
| 6,760,784 B1* | 7/2004 | Bodin | G06F 9/4411 345/593 |
| 7,913,255 B2 | 3/2011 | Codrescu | 718/101 |
| 8,006,247 B2 | 8/2011 | Kalman | 718/108 |
| 8,384,770 B2 | 2/2013 | Konno et al. | 348/51 |
| 8,601,465 B2 | 12/2013 | Bernstein et al. | 717/174 |
| 8,621,494 B2 | 12/2013 | Singh et al. | 719/328 |
| 2002/0019834 A1* | 2/2002 | Vilcauskas, Jr. | G06Q 10/06 715/202 |
| 2005/0034124 A1 | 2/2005 | House et al. | 718/100 |
| 2011/0111865 A1 | 5/2011 | Cadima et al. | 463/43 |
| 2011/0252423 A1 | 10/2011 | Freedman et al. | 718/100 |
| 2012/0159454 A1* | 6/2012 | Barham | G06F 9/45558 717/128 |

* cited by examiner

*Primary Examiner* — Van Nguyen
(74) *Attorney, Agent, or Firm* — Sheppard Mullin Richter & Hampton LLP

(57) ABSTRACT

Time fidelity may be maintained for an instance of a virtual space placed in a background state. The background state may be a state in which user intervention with the instance of the virtual space is disallowed. In contrast, a foreground state may be a state in which user intervention with the instance of the virtual space is allowed. Individual timers may be associated with corresponding events configured to occur within the virtual space. An elapsed time while the instance of the virtual space is in a background state may be determined. Individual timers may be adjusted based on the elapsed time responsive to the instance of the virtual space resuming from the background state to the foreground state in order to maintain time fidelity.

18 Claims, 2 Drawing Sheets

MAINTAINING TIME FIDELITY FOR AN INSTANCE OF A VIRTUAL SPACE PLACED IN A BACKGROUND STATE

FIELD OF THE DISCLOSURE

This disclosure relates to maintaining time fidelity for an instance of a virtual space placed in a background state such that time-based events occur at the intended time when the instance of the virtual space is resumed from the background state to a foreground state.

BACKGROUND

Mobile platforms may recover as many resources (e.g., processing resources) as possible when an application is placed in the background. With Javascript-based applications, for example, execution of the code may be essentially paused when the application is placed in the background. Javascript time functions may not reliably execute on-time (e.g., due to Javascript's single threaded nature as well as its need to process code awaiting execution) until it has an available cycle where it can insert corresponding timers to be fired. The amount of delay that arises for Javascript time functions while the application is in the background may vary wildly based upon what other application is executing in the foreground. Significant differences in time may lead the application to be out of synchronization with servers, which may result in various playability issues for Javascript-based game applications.

SUMMARY

One aspect of the disclosure relates to a system configured to maintain time fidelity for an instance of a virtual space placed in a background state, in accordance with one or more implementations. Exemplary implementations may resolve or greatly alleviate issue regarding time management in Javascript-based mobile games and/or other applications due to limitations in processor speed, which may include: (1) Javascript suspension when the game is placed in the background and (2) time fidelity when the game resumes in the foreground. According to some implementations, when a game is resumed after being place in the background, the time that has passed while in the back ground may be detected and individual timers in the game may be adjusted to reflect the correct point in time. Those individual timers, in turn, may update what they control (e.g., in-game events) to restore time throughout the game. From a user's perspective, events that occur over time or after a given period continue to progress while the game is in the background as they would if the game was in the foreground.

In some implementations, the system may include one or more servers. The server(s) may be configured to communicate with one or more client computing platforms according to a client/server architecture. The users may access the system and/or the virtual space via client computing platform(s). The server(s) may be configured to execute one or more computer program modules. The computer program modules may include one or more of a user module, a space module, a timer module, a state detection module, a lapse determination module, a global timer module, and/or other modules. The user module may be configured to access and/or manage one or more user profiles and/or user information associated with users of the system.

The space module may be configured to implement the instance of the virtual space executed by the computer modules to determine views of the virtual space. The instance of the virtual space may be provided via an application running on a given client computing platform. The instance of the virtual space may be associated with one or more events configured to occur within the virtual space. By way of non-limiting example, events may include one or more of training troops, marching troops, building a city or component thereof, planting crops, researching upgrades of various capabilities (e.g., troop combat capabilities or resource production capacity), and/or other events configured to occur within the virtual space.

A given event may be configured to occur at a corresponding occurrence time within the virtual space. The occurrence time may be a time of day, a specific time relative to when the given event was originally scheduled, a specific time relative to when another event is to occur, and/or other specific time at with the given event is intended to occur. A given event may be configured to occur over a given period of time within the virtual space. For example, the given event may require a certain amount of time to complete, which occurs over the given period of time. The given period of time may begin at a first time and end at a second time such that the difference between the first time and the second time equals the given period of time. A given event may be configured to be completed at a given completion time within the virtual space. Here, the beginning time may be irrelevant so long as me given event is finished by the completion time. The completion time may be a time of day, a specific time relative to when the given event was originally scheduled, a specific time relative to when another event is to occur, and/or other specific time at with the given event is intended to be completed.

The timer module may be configured to manage one or more timers. Individual timers may be associated with individual events. A given timer may be configured to effectively (1) count down to an occurrence time, (2) count down a period of time, and/or (3) count down to a completion time. Effectively counting down may include keeping track of remaining time, counting up to a given time, counting down to a given time, and/or otherwise keeping track of time associated with the occurrence or completion of a given event. In some implementations, a given timer may be associated with an operation rather than an event. Examples of operations may include one or more of updating game data from a server (e.g., the server(s)), controlling progress bar progression, and/or other operations.

The state detection module may be configured to determine whether the instance of the virtual space is in a background state or a foreground state. Generally speaking, a background state may be a state in which user intervention with the instance of the virtual space is disallowed. Conversely, a foreground state may be a state in which user intervention with the instance of the virtual space is allowed. The instance of the virtual space may be placed in the background state responsive to a second application being placed in the foreground state. To illustrate, if there are two applications running on a given client computing platform, a user may be able to interact with only one of the applications at a time—the application in the foreground state. The other application may be in the background state such that some processes associated with the other application may be executed, but the user will not be able to interact with the other application. Execution of the instance of the virtual space may be suspended responsive to the instance of the virtual space being placed in the background state for some or all of the time while in the background state.

The lapse determination module may be configured to determine an elapsed time while the instance of the virtual space is in the background state. In some implementations, the elapsed time may be equal to a duration between (1) a first time at which the instance of the virtual space was placed in the background state and (2) a second time at which the instance of the virtual space was resumed from the background state to the foreground state. According to some implementations, the elapsed time may be equal to a duration during which execution of the instance of the virtual space was suspended while the instance of the virtual space is in the background state.

The global timer module may be configured to adjust individual timers based on the elapsed time responsive to the instance of the virtual space resuming from the background state to the foreground state. A given timer may be adjusted such that the corresponding event (1) occurs at the appropriate occurrence time within the virtual space, (2) occurs over the appropriate period of time within the virtual space, or (3) is completed at the appropriate completion time within the virtual space. This may ensure that, from a user's perspective, events that occur over time or after a given period continue to progress while the instance of the virtual space is in the background as they would if the instance of the virtual space was in the foreground.

In some implementations, the global timer module may be configured to maintain a record of one or more active timers. A given active timer may correspond to a given event that is scheduled, but has not yet occurred within the virtual space. A given timer may become an active timer responsive to one or both of user actions or an occurrence of another corresponding event within the virtual space. For example, a timer associated with a troop marching event may become an active timer and be added to the record responsive to a user action of selecting a troop attack. As another example, a timer associated with a city rebuilding event may become an active timer and be added to the record responsive to an event where the city is destroyed. A given active timer may be removed from the record responsive to an occurrence in the virtual space of a given event corresponding to the given active timer.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
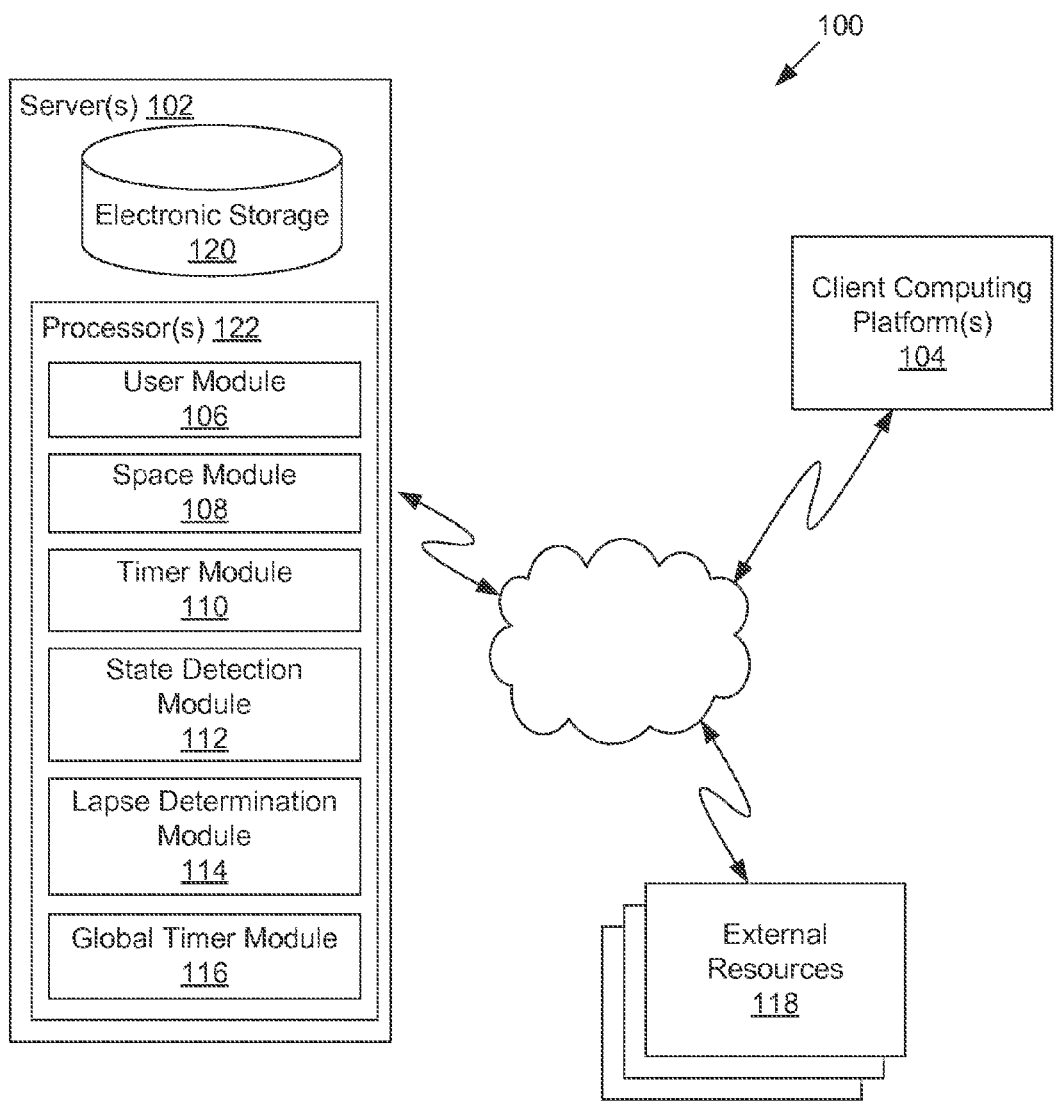
FIG. 1 illustrates a system configured to maintain time fidelity for an instance of a virtual space placed in a background state, in accordance with one or more implementations.

FIG. 1 illustrates a system 100 configured to maintain time fidelity for an instance of a virtual space placed in a background state, in accordance with one or more implementations. Exemplary implementations may resolve or greatly alleviate issue regarding time management in Javascript-based mobile games and/or other applications due to limitations in processor speed, which may include: (1) Javascript suspension when the game is placed in the background and (2) time fidelity when the game resumes in the foreground. According to some implementations, when a game is resumed after being place in the background, the time that has passed while in the back ground may be detected and individual timers in the game may be adjusted to reflect the correct point in time. Those individual timers, in turn, may update what they control (e.g., in-game events) to restore time throughout the game. From a users perspective, events that occur over time or after a given period continue to progress while the game is in the background as they would if the game was in the foreground. Additionally, some implementations support various common gameplay mechanisms such as speed ups, instant finishes, cancellation, formatting of times for display, and/or other mechanisms. While exemplary implementations are described herein in the context of a virtual space, this is not intended to be limiting as the concepts and principles may be applied to other types of applications configured to run on devices where processing resources are prioritized for applications running in the foreground.

In some implementations, system 100 may include one or more servers 102. The server(s) 102 may be configured to communicate with one or more client computing platforms 104 according to a client/server architecture. The users may access system 100 and/or the virtual space via the client computing platform(s). The server(s) 102 may be configured to execute one or more computer program modules. The computer program modules may include one or more of a user module 106, a space module 108, a timer module 110, a state detection module 112, a lapse determination module 114, a global timer module 116, and/or other modules.

The user module 106 may be configured to access and/or manage one or more user profiles and/or user information associated with users of system 100. The one or more user profiles and/or user information may include information stored by server(s) 102, the client computing platform(s), and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The space module 108 may be configured to implement the instance of the virtual space executed by the computer modules to determine views of the virtual space. The instance of the virtual space may be provided via an application running on a given client computing platform 104. The views may be communicated (e.g., via streaming, via object/position data, and/or other information) from server(s) 102 to the client computing platform(s) for presentation to users. The view determined and transmitted to a given client computing platform 104 may correspond to a user character being controlled by a user via the given client computing platform 104. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., the client computing platform(s)) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 108 is not intended to be limiting. The space module 108 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 108, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through the client computing platform(s). The users may interact with each other through communications exchanged within the virtual space. Such communications may include one or more of textual chat, instant messages, private messages, voice communications, and/or other communications. Communications may be received and entered by the users via their respective the client computing platform(s). Communications may be routed to and from the appropriate users through server(s) 102 (e.g., through space module 108).

The instance of the virtual space may be associated with one or more events configured to occur within the virtual space. By way of non-limiting example, events may include one or more of training troops, marching troops, building a city or component thereof, planting crops, researching upgrades of various capabilities (e.g., troop combat capabilities or resource production capacity), and/or other events configured to occur within the virtual space.

A given event may be configured to occur at a corresponding occurrence time within the virtual space. The occurrence time may be a time of day, a specific time relative to when the given event was originally scheduled, a specific time relative to when another event is to occur, and/or other specific time at with the given event is intended to occur. A given event may be configured to occur over a given period of time within the virtual space. For example, the given event may require a certain amount of time to complete, which occurs over the given period of time. The given period of time may begin at a first time and end at a second time such that the difference between the first time and the second time equals the given period of time. A given event may be configured to be completed at a given completion time within the virtual space. Here, the beginning time may be irrelevant so long as the given event is finished by the completion time. The completion time may be a time of day, a specific time relative to when the given event was originally scheduled, a specific time relative to when another event is to occur, and/or other specific time at with the given event is intended to be completed.

The timer module 110 may be configured to manage one or more timers. Individual timers may be associated with individual events. A given timer may be configured to effectively (1) count down to an occurrence time, (2) count down a period of time, and/or (3) count down to a completion time. Effectively counting down may include keeping track of remaining time, counting up to a given time, counting down to a given time, and/or otherwise keeping track of time associated with the occurrence or completion of a given event. In some implementations, a given timer may be associated with an operation rather than an event. Examples of operations may include one or more of updating game data from a server (e.g., server(s) 102), controlling progress bar progression, and/or other operations.

The state detection module 112 may be configured to determine whether the instance of the virtual space is in a background state or a foreground state. Generally speaking, a background state may be a state in which user intervention with the instance of the virtual space is disallowed. Conversely, a foreground state may be a state in which user intervention with the instance of the virtual space is allowed. The instance of the virtual space may be placed in the background state responsive to a second application being placed in the foreground state. To illustrate, if there are two applications running on a given client computing platform 104, a user may be able to interact with only one of the applications at a time—the application in the foreground state. The other application may be in the background state such that some processes associated with the other application may be executed, but the user will not be able to interact with the other application. Execution of the instance of the virtual space may be suspended responsive to the instance of the virtual space being placed in the background state for some or all of the time while in the background state.

The lapse determination module 114 may be configured to determine an elapsed time while the instance of the virtual space is in the background state. In some implementations, the elapsed time may be equal to a duration between (1) a first time at which the instance of the virtual space was placed in the background state and (2) a second time at which the instance of the virtual space was resumed from the background state to the foreground state. According to some implementations, the elapsed time may be equal to a duration during which execution of the instance of the virtual space was suspended while the instance of the virtual space is in the background state.

The global timer module 116 may be configured to adjust individual timers based on the elapsed time responsive to the instance of the virtual space resuming from the background state to the foreground state. A given timer may be adjusted such that the corresponding event (1) occurs at the appropriate occurrence time within the virtual space, (2) occurs over the appropriate period of time within the virtual space, or (3) is completed at the appropriate completion time within the virtual space. This may ensure that, from a user's perspective, events that occur over time or after a given period continue to progress while the instance of the virtual space is in the background as they would if the instance of the virtual space was in the foreground.

In some implementations, global timer module 116 may be configured to maintain a record of one or more active timers. A given active timer may correspond to a given event that is scheduled, but has not yet occurred within the virtual space. A given timer may become an active timer responsive to one or both of user actions or an occurrence of another corresponding event within the virtual space. For example, a timer associated with a troop marching event may become an active timer and be added to the record responsive to a user action of selecting a troop attack. As another example, a timer associated with a city rebuilding event may become an active timer and be added to the record responsive to an event where the city is destroyed. A given active timer may be removed from the record responsive to an occurrence in the virtual space of a given event corresponding to the given active timer.

In some implementations, global timer module 116 may manage the active timers with a single "setInterval." The setInterval may run at the minimum necessary interval at some or all times to fulfil the various needs of the instance of the virtual space. This may allow for lower processing overhead by only running as needed. As timers are added and removed from the setInterval, the interval may be adjusted accordingly. The intervals available while the instance of the virtual space is provided may be added when the instance of the virtual space is initialized according to individual needs of the instance of the virtual space. Available intervals may include one or more of 1 second, 5 seconds, 15 seconds, 30 seconds, 60 seconds, any combination of the available intervals, and/or other intervals.

In some implementations, server(s) 102, the client computing platform(s), and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, the client computing platform(s), and/or external resources 118 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 118, and/or provide other functionality attributed herein to the client computing platform(s). By way of non-limiting example, the given client computing platform 104 may include one or more of a desktop computer, a laptop computer, a handheld computer, a NetBook, a Smartphone, a gaming console, and/or other computing platforms.

The external resources 118 may include sources of information, hosts and/or providers of virtual environments outside of system 100, external entities participating with system 100, and/or other resources. In some implementations, some or all of the functionality attributed herein to external resources 118 may be provided by resources included in system 100.

The server(s) 102 may include electronic storage 120, one or more processors 122, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may comprise electronic storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from the client computing platform(s), and/or other information that enables server(s) 102 to function as described herein.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. The processor(s) 122 may be configured to execute modules 106, 108, 110, 112, 114, 116, and/or other modules. Processor(s) 122 may be configured to execute modules 106, 108, 110, 112, 114, 116, and/or other modules by software; hardware; firmware; some combination of software, hardware, and/or firmware; and/or other mechanisms for configuring processing capabilities on processor(s) 122.

It should be appreciated that although modules 106, 108, 110, 112, 114, and 116 are illustrated in FIG. 1 as being co-located within a single processing unit, in implementations in which processor(s) 122 includes multiple processing units, one or more of modules 106, 108, 110, 112, 114, and/or 116 may be located remotely from the other modules. The description of the functionality provided by the different modules 106, 108, 110, 112, 114, and/or 116 described below is for illustrative purposes, and is not intended to be limiting, as any of modules 106, 108, 110, 112, 114, and/or 116 may provide more or less functionality than is described. For example, one or more of modules 106, 108, 110, 112, 114, and/or 116 may be eliminated, and some or all of its functionality may be provided by other ones of modules 106, 108, 110, 112, 114, and/or 116. As another example, processor(s) 122 may be configured to execute one or more additional modules that may perform some or all of the functionality attributed herein to one of modules 106, 108, 110, 112, 114, and/or 116.

Figure 2:
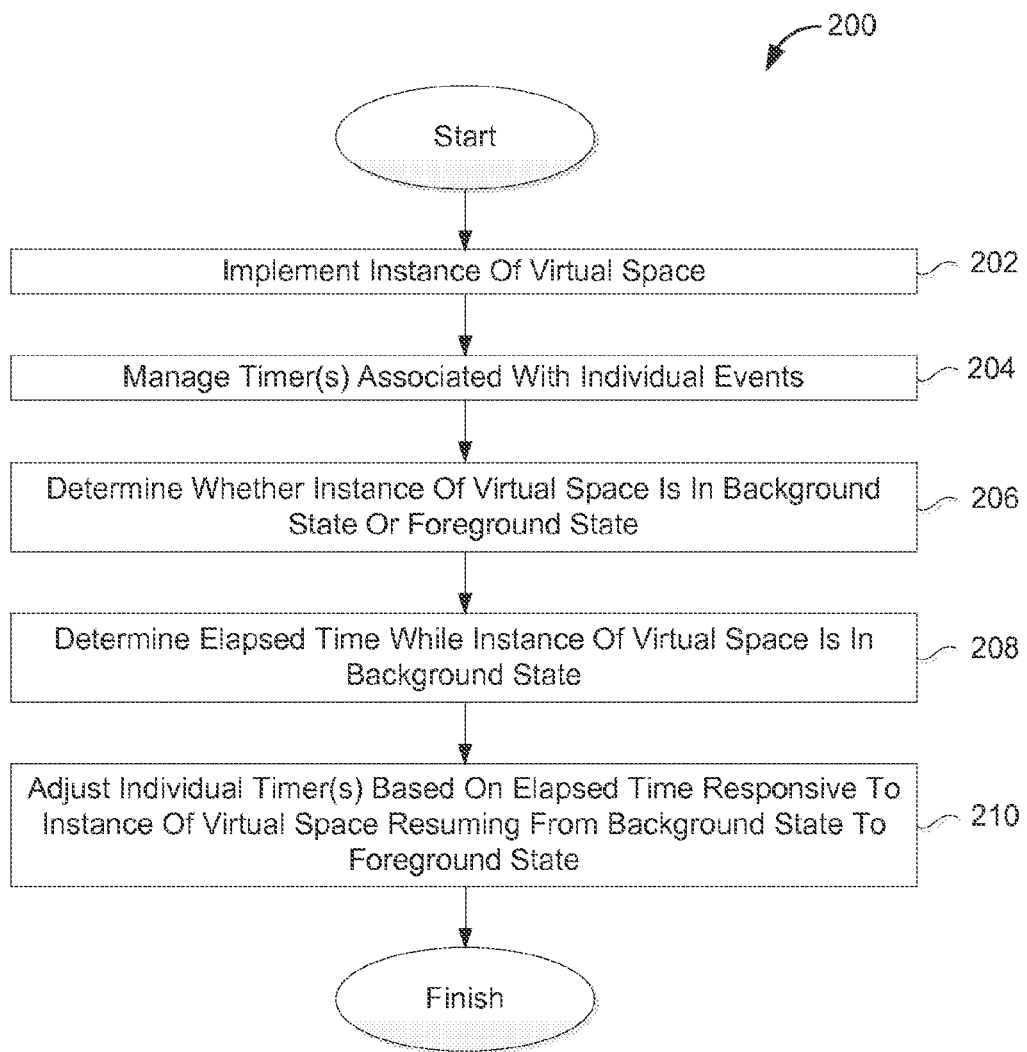
FIG. 2 illustrates a method for maintaining time fidelity for an instance of a virtual space placed in a background state, in accordance with one or more implementations.

FIG. 2 illustrates a method 200 for maintaining time fidelity for an instance of a virtual space placed in a background state, in accordance with one or more implementations. The operations of method 200 presented below are intended to be illustrative, in some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of a virtual space may be implemented to determine views of the virtual space. The instance being associated with one or more events configured to occur within the virtual space. Operation 202 may be performed by a space module that is the same as or similar to space module 108, in accordance with one or more implementations.

At an operation 204, one or more timers associated with individual events may be managed. Operation 204 may be performed by a timer module that is the same as or similar to timer module 110, in accordance with one or more implementations.

At an operation 206, a determination may be made as to whether the instance of the virtual space is in a background state or a foreground state. Operation 206 may be performed by a state detection module that is the same as or similar to state detection module 112, in accordance with one or more implementations.

At an operation 208, an elapsed time while the instance of the virtual space is in a background state may be determined. Operation 208 may be performed by a lapse determination module that is the same as or similar to lapse determination module 114, in accordance with one or more implementations.

At an operation 210, individual ones of the one or more timers may be adjusted based on the elapsed time responsive to the instance of the virtual space resuming from the background state to the foreground state. Operation 210 may be performed by a global timer module that is the same as or similar to global timer module 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to maintain time fidelity for an instance of a virtual space placed in a background state, the system comprising:
   one or more processors configured by machine-readable instructions to:
      implement the instance of the virtual space to determine views of the virtual space, the instance being associated with one or more timers, wherein the virtual space has a state associated with the time provided by the one or more timers, wherein the one or more timers measure the passage of time in the virtual space at a first rate;
      determine an elapsed time while the instance of the virtual space is in a background state, the background state being a state in which user intervention with the instance of the virtual space is disallowed and the one or more timers measure the passage of time in the virtual space at a second rate different from the first rate; and
      adjust the one or more timers in response to the virtual space exiting the background state, the adjustment to the one or more timers being based on the elapsed time such that the one or more timers are adjusted to a time they would have had had they been running at the first rate over the elapsed time;
      wherein the the state of the virtual space is adjusted to correspond to the adjusted time of the one or more timers.

2. The system of claim 1, wherein execution of the instance of the virtual space is suspended responsive to the instance of the virtual space being in the background state.

3. The system of claim 1, wherein the one or more processors are further configured by machine-readable instructions to determine the state of the instance of the virtual space.

4. The system of claim 1, wherein the instance of the virtual space is placed in the background state responsive to execution of a second application.

5. The system of claim 1, wherein the elapsed time is equal to a duration between (1) a first time at which the instance of the virtual space was placed in the background state and (2) a second time at which the instance of the virtual space was resumed from the background state.

6. The system of claim 1, wherein the elapsed time is equal to a duration during which execution of the instance of the virtual space was suspended while the instance of the virtual space is in the background state.

7. The system of claim 1, wherein the one or more processors are configured by machine-readable instructions to maintain a record of one or more active timers, a given active timer corresponding to a given event that has not yet occurred within the virtual space.

8. The system of claim 7, wherein a given one of the one or more timers become an active timer responsive to one or both of user actions or an occurrence of another corresponding event within the virtual space.

9. The system of claim 7, wherein a given active timer is removed from the record responsive to an occurrence in the virtual space of a given event corresponding to the given active timer.

10. A computer-implemented method for maintaining time fidelity for an instance of a virtual space placed in a background state, the method being performed by one or more processors configured by machine-readable instructions, the method comprising:
 implementing the instance of the virtual space to determine views of the virtual space, the instance being associated with one or more timers, wherein the virtual space has a state associated with the time provided by the one or more timers, wherein the one or more timers measure the passage of time in the virtual space at a first rate
 determining an elapsed time while the instance of the virtual space is in a background state, the background state being a state in which user intervention with the instance of the virtual space is disallowed and the one or more timers measure the passage of time in the virtual space at a second rate different from the first rate, and
 adjusting the one or more timers in response to the virtual space exiting the background state, the adjustment to the one or more timers being based on the elapsed time such that the one or more timers are adjusted to a time they would have had had they been running at the first rate over the elapsed time;
 wherein the state of the virtual space is adjusted to correspond to the adjusted time of the one or more timers.

11. The method of claim 10, wherein execution of the instance of the virtual space is suspended responsive to the instance of the virtual space being in the background state.

12. The method of claim 10, further comprising determining the state of the instance of the virtual space.

13. The method of claim 10, wherein the instance of the virtual space is placed in the background state responsive to execution of a second application.

14. The method of claim 10, wherein the elapsed time is equal to a duration between (1) a first time at which the instance of the virtual space was placed in the background state and (2) a second time at which the instance of the virtual space was resumed from the background state.

15. The method of claim 10, wherein the elapsed time is equal to a duration during which execution of the instance of the virtual space was suspended while the instance of the virtual space is in the background state.

16. The method of claim 10, further comprising maintaining a record of one or more active timers, a given active timer corresponding to a given event that has not yet occurred within the virtual space.

17. The method of claim 16, wherein a given one of the one or more timers become an active timer responsive to one or both of user actions or an occurrence of another corresponding event within the virtual space.

18. The method of claim 16, wherein a given active timer is removed from the record responsive to an occurrence in the virtual space of a given event corresponding to the given active timer.

* * * * *